United States Patent [19]

Robinson

[11] Patent Number: 4,747,981
[45] Date of Patent: May 31, 1988

[54] METHOD OF MOLDING A URETHANE REFLECTOR

[76] Inventor: Jesse L. Robinson, 5481 S. Shingle Rd., Shingle Springs, Calif. 95682

[21] Appl. No.: 785,008

[22] Filed: Oct. 7, 1985

[51] Int. Cl.⁴ .............................................. B29D 11/00
[52] U.S. Cl. ..................................... 264/1.9; 350/103; 425/808
[58] Field of Search .......................... 264/1.9; 425/808; 350/103, 100

[56] References Cited

U.S. PATENT DOCUMENTS

| | | | |
|---|---|---|---|
| 3,258,840 | 7/1966 | Hedgewick et al. | 350/103 |
| 3,332,327 | 7/1967 | Heeman | 350/103 |
| 3,632,695 | 1/1972 | Howell | 425/808 |
| 3,972,586 | 8/1976 | Arnott et al. | 350/100 |
| 3,984,175 | 10/1976 | Suhr et al. | 350/103 |
| 4,095,773 | 6/1978 | Linder | 425/808 |
| 4,264,544 | 4/1981 | Wilheim | 264/331.19 |
| 4,297,051 | 10/1981 | Robinson | 404/11 |

FOREIGN PATENT DOCUMENTS

| | | | |
|---|---|---|---|
| 45299 | 4/1977 | Japan | 264/1.9 |
| 46237 | 3/1982 | Japan | 264/1.9 |
| 109629 | 7/1982 | Japan | 264/1.9 |
| 29630 | 2/1983 | Japan | 264/1.9 |
| 54511 | 3/1984 | Japan | 264/246 |
| 1275555 | 5/1972 | United Kingdom | 264/331.19 |
| 1594206 | 7/1981 | United Kingdom | 264/1.9 |

*Primary Examiner*—James Lowe
*Attorney, Agent, or Firm*—Thomas M. Freiburger

[57] ABSTRACT

A method is disclosed for molding a reflector of light-transmissive urethane, with a retroreflective pattern of a multiplicity of angled facets at the back surface of the reflector. In a mold cavity for the reflector there is provided a mold portion shaped to form the multiplicity of angled facets. Prior to filling of the mold, there is applied to the mold portion temporarily a transfer coating of a material which will maintain the angled facets reflective in a urethane reflector. A releasing agent is applied to the remainder of the mold other than the subject mold portion, then the mold is filled with urethane material. Once the urethane material has set, the mold is opened and the molded urethane is stripped off the special mold portion, leaving the transfer coating, which acts as a release coating, adhered to the angled facets.

5 Claims, 2 Drawing Sheets

METHOD OF MOLDING A URETHANE REFLECTOR

BACKGROUND OF THE INVENTION

The invention relates to production of reflective bodies such as road markers, and more particularly to the molding of a reflective body having "retroreflective" angled facets at its back surface for reflecting back light passing into the reflective body from the front.

Road markers having reflective features are well known. Generally, these are molded of relatively rigid plastics such as polyethylene, polyproplene, polycarbonates, or acrylic material. Taillight lenses for automobiles have been similarly produced.

These reflectors and reflective markers have often included so called "retroreflective" back surfaces comprising a multiplicity of angled facets, one such configuration being cube corners. See, for example, U.S. Pat. Nos. 3,684,348 and 3,810,804 (both to W. P. Rowland). See also U.S. Pats. Nos. 3,215,039, 3,450,459, 3,716,445, 3,785,719 and 3,851,947 for other retroreflective or reflex reflectors of various geometries.

It is also known to fabricate certain roadway markers of flexible urethane material, as disclosed in my earlier U.S. Pat. No. 4,297,051. That patent was directed to a deformable roadway marker having a dome-shaped top which would deform elastically downwardly when struck by a snowplow blade, then return to the domed configuration, thereby permitting the use of raised reflective "bumps" on a road surface in geographical areas experiencing snow in winter. Urethane is an excellent material for this purpose because of its flexibility, toughness, clarity and consisting in physical properties through wide ranges of temperature.

In my earlier patent, I disclosed the use of a strip or body of reflective material placed in the mold and captured into the molded urethane marker between its top and bottom surfaces, so that light from automobile headlights would pass through the light-transmitting surface of the marker and be reflected back out by the strip of reflective material inside.

Prior to the present invention, there has not been any practicable way for achieving the molding of retroreflective angled facets on the back surface of a flexible urethane marker, although this has been achieved with other, more rigid plastics. In forming molded retroreflective reflector articles from hard plastics, such as used in automotive tail lenses, it has been common practice to use a mold piece carrying reflex facets, the mold piece being held within the mold when the plastic material is injected.

Urethane is an adhesive, very tenacious material as it hardens, and when it is molded the mold must be coated with a release agent in order to successfully remove the urethane article from the mold. However, known release agents generally will destroy the effect of multiple-facet retroreflective surfacing molded on a urethane article. This is because the optic surface of the reflective facets will be clouded by these mold releasing agents. The facets must be precisely planar and uniform, and such surface irregularities will cause diffusion of the light striking the facets, rather than the precisely directed reflection needed in such a marker.

In general, optical plastic parts cannot be molded using a release agent, and urethane, a particular plastic, requires the use of a releasing agent or something which functions as a releasing agent.

No practicable system or method was available for molding reflex facets on a flexible urethane reflective article, prior to the present invention described below.

SUMMARY OF THE INVENTION

A molding method according to the present invention overcomes the above problems and enables the efficient molding of a reflex multi-faceted reflector, such as of cube corners, in the back surface of a flexible urethane reflector article.

In accordance with the invention, a reflective body is formed of light-transmissive urethane by providing a mold having a mold cavity generally in the shape of the body to be molded, and providing in association with the mold a mold piece or portion shaped to form a multiplicity of angled facets or reflex facets. Prior to filling of the mold, there is applied to the special mold portion temporarily a transfer coating of a material which will maintain the angled facets reflective if applied to them on a urethane marker.

To the remainder of the mold other than the special portion there is applied a conventional releasing agent suitable for the urethane material and the particular mold being used.

The mold is closed and filled with the urethane molding material, which is transparent or substantially transparent. Once the urethane has set, the mold is opened, and the molded body is stripped off the mold. At the special mold portion the transfer coating acts as a release coating, and remains adhered to the angled facets on the urethane molded body.

Preferably, the transfer coating is a very thin coating of a highly reflective metallic material, such as a material containing silver. This places a reflective backing on the multiplicity of angled facets or reflex surfaces, maintaining the reflectivity that ideal surfaces would have it backed by air.

In this way, the use of a traditional release agent on the special mold portion containing the facets is avoided, but the release of the molded urethane facets from the mold is facilitated by the metallic transfer coating, which adheres much more strongly to the urethane than to the special mold piece on which it is first deposited.

The special mold piece may comprise a mold component separate from the mold itself, and it may be formed of any suitable material to which the reflective metallic transfer coating material will adhere to a significantly lesser extent than it will adhere to the urethane. For example, it may be formed of a plastic having low adhersion factor to matallization.

During molding, the separate insert piece is positioned and held in proper position in the mold cavity. It may alternatively be integral with one of the mold sections.

The transfer coating is sufficiently thin to remain intact on the angled facets of the final molded urethane article even during bending and deflection of the reflective body.

Accordingly, it is among the objects of the present invention to provide a molding method which will enable the formation of a flexible urethane reflective body having reflex facets on a back surface for retroreflective action, particularly for use as a roadway marker. These and other objects, advantages, features and characteristics of the invention will be apparent from the following description of a preferred embodiment, considered along with the accompanying drawings.

BRIEF DESCRIPTION OF THE DRAWINGS

FIG. 3 illustrates a transfer coating deposited on the mold insert component, an early step in the molding of an article in accordance with the invention.

DESCRIPTION OF THE PREFERRED EMBODIMENT

Figure 1:
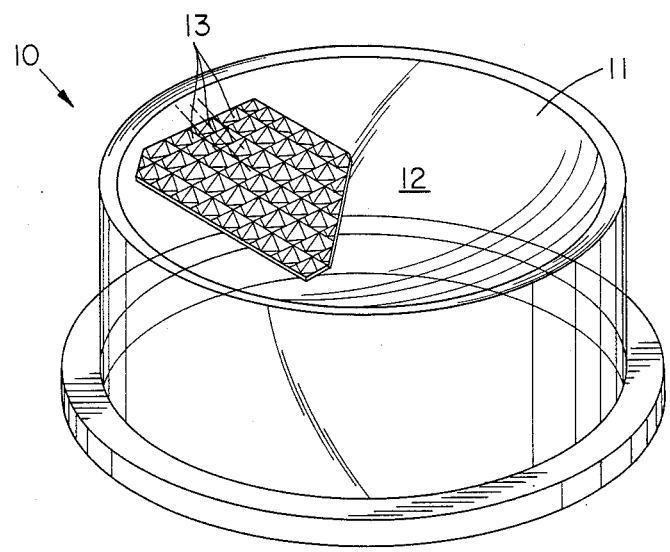
FIG. 1 is view in perspective showing a reflective urethane marker article which is desired to be molded, the article having a multiplicity of angled facets or reflex facets on its back or interior surface.

In the drawings, FIG. 1 shows a reflective marker 10 generally of the configuration shown in U.S. Pat. No. 4,297,051, as an example of a reflective urethane article which can be produced with a molding process in accordance with the invention. The article 10 is of transparent or substantially transparent flexible urethane, and in the configuration shown, it may serve as a roadway marker to be emplaced in a bore formed in a roadway pavement, such that a domed-top surface 11 extends above the pavement, as explained in the referenced patent. An example of a suitable urethane material for use in the method of the invention in Uniroyal LW520.

The underside or back surface 12 of the urethane reflector article 10 includes a multiplicity of angled facets 13, generally of any suitable known configuration for this purpose, such as cube corners. The facets 13 will act to reflect back light, as from automotive headlights, which approaches the translucent or transparent marker 10 from almost any direction. Such a reflective characteristic has been known as "retroreflective", indicating that the light is reflected back toward the direction from which it came.

The term "back" surface or side is used herein in reference to the side 12 of the marker having the retroreflective facets 13. It is the "back" side with respect to the direction of entry of the light to be reflected. The domed-top road-recessed marker 10 shown and described herein is one example of the method of the invention, but other, simpler reflector structures are also encompassed.

Figure 2:
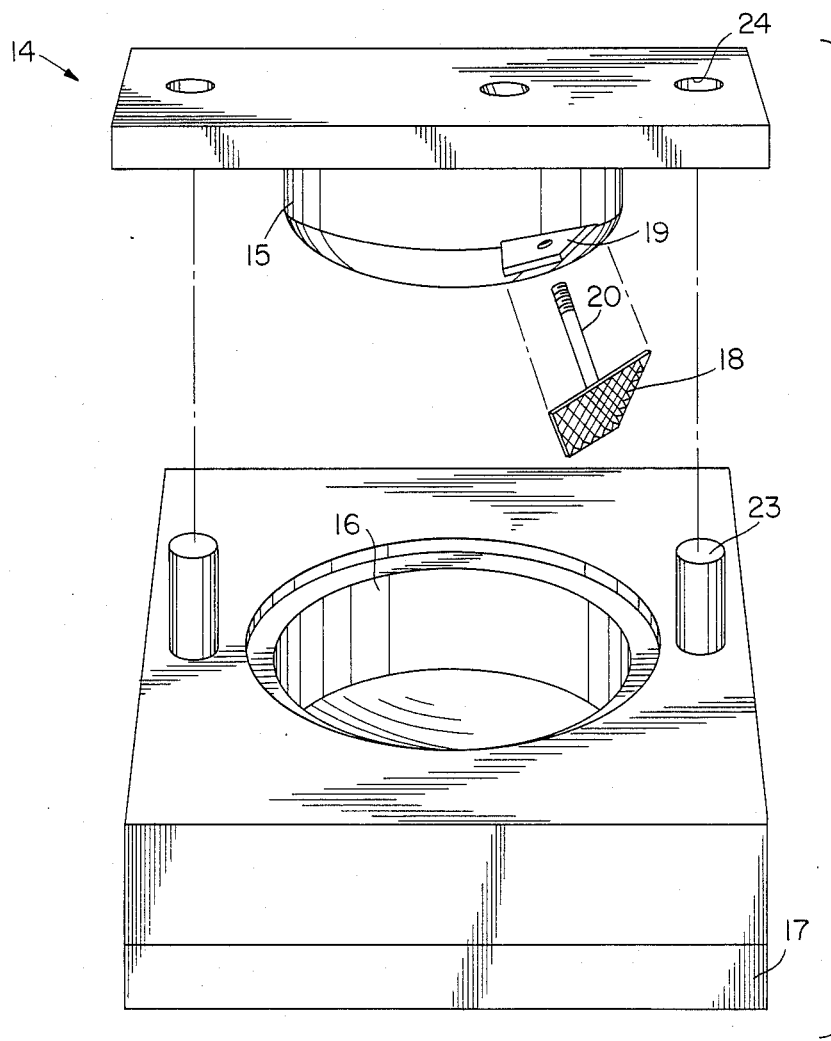
FIG. 2 is a view in perspective showing a mold in an opened position, and a special mold component which may be integral with or separate from the mold itself, for forming the retroreflective reflex facets when the mold is filled.

In FIG. 2 a mold generally identified as 14 is shown, comprising plug and cavity mold sections 15 and 16, for forming the retroreflective flexible urethane marker 10. A separate mold section 17 may form a bottom (domed top, on the finished item 10) for the mold cavity 16, assembled to the mold section 16 prior to filling.

Figure 4:
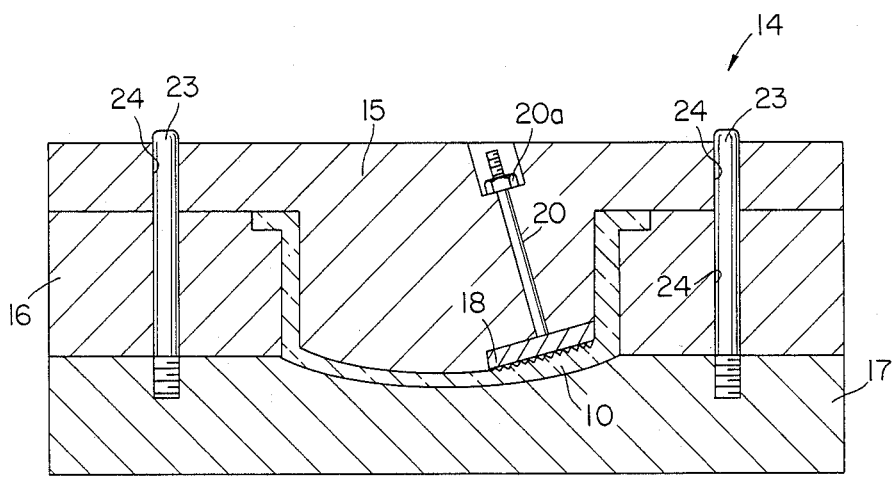
FIG. 4 is a sectional elevation view showing the mold and special molding component with the mold in the closed position and filled with urethane molding material.

Also shown in association with the mold 14 is a special mold piece or insert components 18, which is positioned and held generally in the location indicated in FIG. 2, i.e., in a recess 19 in the body of the mold section 15, when the mold is to be closed and filled. The special mold insert piece 18 may be held in place on the plug mold section 15 by a machine screw or stud 20, for example, inserted through the mold section 15 as indicated as fastened with a nut 20a (FIG. 4). Any other suitable arrangement may be used in lieu of what is shown.

Figure 3:
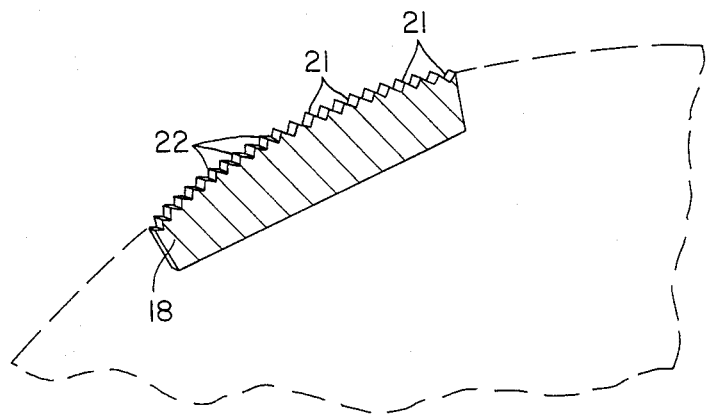
FIG. 3 is an enlarged sectional view showing the special mold component, with another part of the mold shown in dashed lines.

As illustrated particularly in FIG. 3, the special mold component or insert piece 18 has an outer surface comprising a multiplicity of precision-cut angled facets 21, which may be in the cube corner configuration or any other suitable geometric shape which will produce on a molded article the retroreflective characteristic. The special mold component 18 may be formed of metal or rigid plastic or other suitable material having a surface characteristic as will be described below.

It should also be understood that the mold component 18 may be fixed permanently into the mold section 15 or even integral therewith, if desired, but practical considerations may make it preferable to have the component 18 as a separate, removable piece. These considerations include the machining of the facets 21 on the component, as well as the depositing of a transfer coating to the mold component 18, a part of the method of the invention which will be explained below.

Before the mold 14 is closed together, the insert piece 18 is coated with a transfer coating 22. This transfer coating, indicated as a surface layer over the insert piece 18 in FIG. 3, is applied to the mold component 18 temporarily, to be transferred onto the surface of the urethane in the molding process. It may comprise a metallic material, or any other suitable material which will maintain the angled urethane facets reflective if applied as a backing to the facets on a urethane marker.

The special mold portion 18 may be formed of a plastic having a low adhesion factor to metallization, such as Monsanto RP260, DuPont Minlon LC40 or Allied Chemical CP1030. Only about 3 to 4 p.s.i. is required to pull most types of metallization off these plastics, whereas 8 to 12 p.s.i. may be required with most other plastics, and much greater force for urethane.

The transfer coating 22 may be applied by depositing, such as by electroplating or other deposition techniques, in a very thin coating, sufficiently thin so that it will remain intact on the angled facets 12 of the molded urethane marker even during bending and deflection of the marker, such as in the domed portion 11 of the marker 10 shown in FIG. 1. The thickness may be about one mil, but the thickness of the coating will depend upon the particular coating material used, the requirement being that the coating be flexible enough to bend with the urethane marker without cracking or becoming disengaged from the urethane surfaces. The thin coating reproduces the precision of the angled facets 21 against the urethane in the molding process.

All areas of the mold which will contact the urethane, other than the multifaceted surface of the mold piece 18, are coated with a suitable conventional releasing agent, as is typically used to release urethane from a mold.

FIG. 4 shows the mold 14 in the closed position, with the plug mold section 15 seated on the cavity mold section 16, aligned to the proper position by pins 23 fitted in openings 24 in the mold section 15, and also the section 16. The urethane molding material has been poured into the mold cavity 16 prior to placement of the plug mold section 15. The special mold insert piece 18 is in position against the plug section 14 as illustrated and will form the desired retroreflective or reflex facets 13 on the finished molded article, on the inside surface of the domed portion 11.

The LW520 urethane molding material is not suitable for injection molding and so the method is shown in connection with an open-casting type mold 14, wherein the plug section 15 is lowered into place in the filled cavity, displacing urethane and sometime requiring subsequent trimming of a resulting flashing formed at the outer periphery. However, the method of the invention also encompasses injection molding, with any urethane suitable for injection molding and still having the clarity and other properties desired for the marker.

When the mold is opened, i.e., the section 15 is removed, the section 15 is stripped from the molded urethane article 10. The release agent has enabled the mold to be opened to release it from most areas of the urethane. At the insert piece 18, the transfer coating 22 essentially acts as a releasing agent, facilitating the removal of the molded urethane from the facets 21. The transfer coating is left on the molded retroreflective facets 13 (FIG. 1) on the molded article, as a backing to the facets.

Alternatively, the insert piece 18 may if desired be released from the molded urethane body 10 after the upper mold section 15 has been removed, by removal of the fastened nut 20a (FIG. 4). The multifaceted mold portion 18 may then be carefully stripped off the urethane, leaving the reflective transfer coating, after the mold section 15 has been removed.

The preferred embodiment described herein is intended to illustrate the principles of the invention, but not to be limiting of its scope. Various other embodiments will be apparent to those skilled in the art and may be made without departing from the spirit and scope of the invention as defined in the following claims.

I claim:

1. A method for molding a flexible reflective body of light-transmissive urethane, with a multiplicity of precision shaped angled facets formed in the back surface of the body necessary for reflecting back light passing into the body from the front, comprising:

providing a mold having a mold cavity generally in the shape of the body to be molded;

providing in association with the mold a portion precision shaped to form said multiplicity of angled facets;

prior to filling the mold, applying to said portion temporarily a transfer coating of a material which will maintain said angled facets reflective on a urethane marker and which will not cause scatter or diffusion of light from said angled facets as the light is reflected off the angled facets back through the urethane body toward the front, said transfer coating being sufficiently thin as to substantially reproduce said precision shaped angled facets on the side of the coating opposite said mold portion;

applying a releasing agent to the remainder of the mold other than said portion, said releasing agent being of the type which would be likely cause deformation or clouding of said angled facets on the urethane body if applied to the facets;

filling the mold with urethane material, and allowing the urethane to set with the mold closed; and opening the mold and removing the resulting molded flexible urethane body from the mold, including stripping the urethane off said portion of the mold, leaving the transfer coating, which acts as a release coating, adhered to said angled facets formed in the back surface of the molded body.

2. The method of claim 1, wherein the transfer coating material is a reflective metallic material.

3. The method of claim 2, wherein said portion comprises a mold component separate from the mold and of a material to which the reflective metallic material will adhere to lesser extent than it will adhere to the urethane molding material, the method including positioning and holding said portion in proper location in the mold cavity for forming the angled facets when the mold is filled.

4. The method of claim 3, wherein the mold component comprises a plastic material having a low adhesion factor to metallization, with about 3 to 4 p.s.i. required to pull the reflective metallic material off the mold component.

5. The method of claim 2, wherein the transfer coating is sufficiently thin to remain intact on the angled facets during bending and deflection of the reflective body.

* * * * *